United States Patent
Airey

[15] 3,656,050
[45] Apr. 11, 1972

[54] TRANSISTORIZED VOLTAGE REGULATOR CIRCUIT

[72] Inventor: John M. Airey, Winchester, Mass.
[73] Assignee: GTE Laboratories Incorporated
[22] Filed: May 25, 1970
[21] Appl. No.: 40,157

[52] U.S. Cl. .................................. 322/28, 322/33, 322/58, 322/73
[51] Int. Cl. ........................................................ H02p 9/30
[58] Field of Search .............................. 322/28, 33, 58, 73

[56] References Cited

UNITED STATES PATENTS

| | | | |
|---|---|---|---|
| 3,273,049 | 9/1966 | Shano | 322/28 |
| 3,378,708 | 4/1968 | Baker | 322/28 X |
| 3,491,285 | 1/1970 | Nowakowski | 322/28 X |
| 3,525,924 | 8/1970 | Atterholt | 322/28 |

Primary Examiner—Benjamin Dobeck
Assistant Examiner—H. Huberfeld
Attorney—Irving M. Kriegsman

[57] ABSTRACT

A transistorized voltage regulator circuit employing regenerative feedback for controlling current flow through the field winding of a dc generator or alternator such as commonly employed in conjunction with a storage battery in automotive vehicles. When the voltage across the terminals of the storage battery, comprising both a dc voltage portion and a superimposed periodic ac voltage portion, has a value less than a predetermined regulation value, current is provided to the field winding by means of a complementary pair of output transistors including a low-cost npn output power transistor connected in series with field winding and a pnp output transistor interconnected with the npn output power transistor so as to provide maximum current flow to the field winding.

When the voltage across the terminals of the storage battery reaches a value which equals or exceeds the predetermined regulation value, a control circuit including a pnp control transistor and a resistive voltage-divider-Zener breakdown diode arrangement operates to cause the output transistors to switch to their non-conducting states thereby terminating current flow to the field winding. To insure rapid and abrupt switching of the output transistors from their conducting states to their non-conducting states, and vice versa, thereby to prevent excessive power dissipation in the output transistors, a regenerative feedback circuit is provided between the output circuit of the npn output power transistor and the input of the Zener diode to couple regenerative (positive) feedback to the input of the Zener diode.

14 Claims, 1 Drawing Figure

Patented April 11, 1972          3,656,050
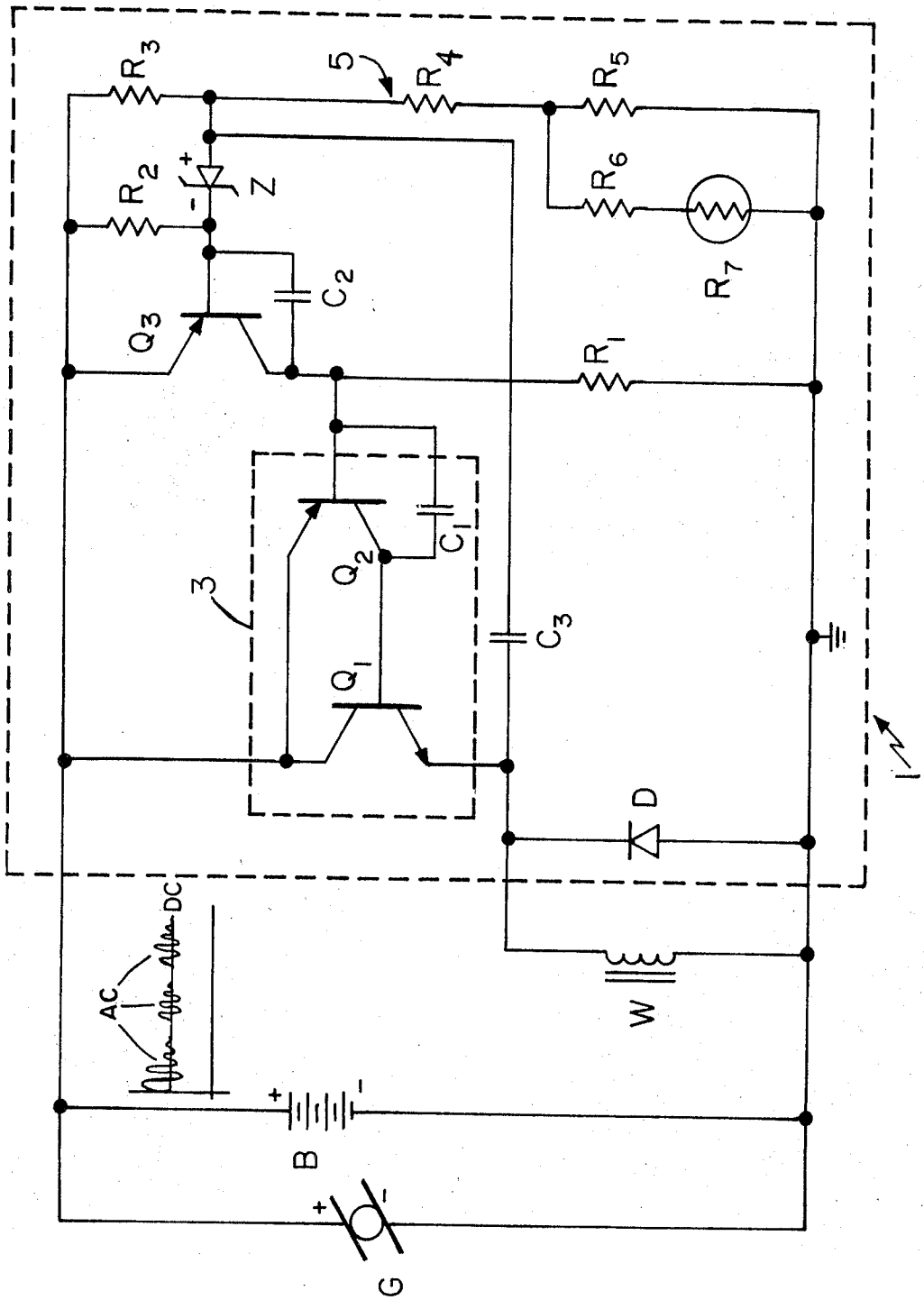
INVENTOR.
JOHN M. AIREY
BY Peter Xrarhos

TRANSISTORIZED VOLTAGE REGULATOR CIRCUIT

BACKGROUND OF THE INVENTION

The present invention relates to a voltage regulator circuit and, more particularly, to a transistorized voltage regulator circuit for controlling current flow through a field winding of a DC generator or alternator such as commonly employed in automotive vehicles.

A variety of transistorized voltage regulator circuits for controlling current flow through the field winding of the DC generator or alternator of a vehicle are well known to those skilled in the art. For example, a common type of transistorized voltage regulator circuit as proposed for use in vehicles includes an output power transistor coupled in series with the field winding of a DC generator or alternator and operable when the vehicle storage battery voltage is below a predetermined regulation value to conduct and supply current to the field winding for the purpose of charging the storage battery toward the regulation value. When the vehicle battery voltage has a value which equals or exceeds the predetermined regulation value, one or more control devices (e.g., transistors) operate in conjunction with a voltage-divider-breakdown device arrangement to terminate current flow through the output power transistor and the field winding.

Although voltage regulator circuits of the above type are generally satisfactory, it may occur that the output power transistor does not become fully non-conducting in response to the vehicle battery voltage equalling or exceeding the predetermined regulation value, thereby resulting in excessive power dissipation in the output power transistor. For this reason, some voltage regulator circuits of the above general type also include a regenerative feedback arrangement for completely and abruptly terminating current flow through the output power transistor and the field winding in response to the value of the vehicle battery voltage equalling or exceeding the predetermined regulation value. By way of a specific example, the regenerative feedback arrangement may comprise a feedback resistor connected in series with both the output power transistor and the field winding for providing regenerative feedback voltage to some suitable triggering point in the circuit at such time as the output power transistor starts to switch to its non-conducting state, and also a capacitor coupled between the output power transistor and a suitable triggering point in the circuit for establishing additional regenerative feedback voltage at such time as the output power transistor starts to switch to its non-conducting state. Alternatively, the resistor regenerative feedback arrangement alone may be used.

Although the abovementioned transistorized "regenerative feedback" voltage regulator circuits provide reasonably effective control of the current established through the field winding of a DC generator or alternator, each of such circuits has certain shortcomings. For example, in those cases where regenerative feedback is provided by a resistor in series with the output power transistor and the field winding, a voltage drop is established across the resistor during the conduction time of the output power transistor which serves to limit the maximum amount of current available to the field winding to be used for charging up the vehicle battery. In those cases where regenerative feedback is also provided by a capacitor, the number of circuit components required to transform the regenerative feedback to voltage signals and voltage levels suitable for completely and abruptly terminating conduction in the output power transistor can be substantial and involve a large number of circuit connections, thereby adding to the overall cost of the voltage regulator circuit.

In addition to the abovementioned problems with the prior art transistorized regenerative feedback voltage regulator circuits, and with prior art transistorized voltage regulator circuits in general, in those cases where one end of a DC generator or alternator field winding is connected electrically to the negative terminal of the battery, a constraint which is inherently present in the electrical systems of many U.S.-made passenger vehicles, it has been the practice heretofore to use a germanium or silicon pnp output power transistor for supplying current to the field winding. Germanium pnp power transistors, while relatively inexpensive, are susceptible to producing excessive leakage currents at high ambient temperatures and are therefore unsuitable for many voltage regulator applications. Silicon pnp power transistors, while more stable than germanium pnp power transistors at high ambient temperatures, are relatively expensive and, hence, are unattractive from an economic standpoint for many voltage regulator applications.

BRIEF SUMMARY OF THE INVENTION

Briefly, in accordance with the present invention, a voltage regulator circuit is provided for an electrical system, for example, an automotive electrical system, which avoids many of the shortcomings and problems associated with the above-described prior art voltage regulator circuits. The electrical system with which the voltage regulator circuit of the present invention is concerned includes a power source such as a dc generator or alternator (ac generator) and a storage battery which is charged in response to current flow established through a control winding such as a field winding included in the dc generator or alternator and having one end thereof connected directly to the first of two voltage terminals of the storage battery.

The voltage regulator circuit in accordance with the present invention comprises a first output transistor of a first conductivity type and a second output transistor of the opposite conductivity type. The collector of the first output transistor is coupled to the second one of the two voltage terminals of the storage battery and the emitter is coupled to the other end of the control winding. The collector of the second output transistor is coupled to the base of the first output transistor and the emitter is coupled to the collector of the first output transistor. In addition to the above circuit elements, a control circuit is provided which is coupled across the first and second voltage terminals of the storage battery and to the base of the second output transistor for controlling the operation of the first and second output transistors in accordance with the particular values of the output voltage established across the first and second voltage terminals of the storage battery. More specifically, when the output voltage across the first and second voltage terminals of the storage battery has a value less than a predetermined regulation value, the control circuit operates to produce a first signal condition at the base of the second output transistor to cause both the first and second output transistors to operate in their conducting states and to establish current flow therethrough and to the control winding. When the output voltage across the first and second voltage terminals of the storage battery has a value equal to or exceeding the predetermined regulation value, however, the control circuit operates to produce a second signal condition at the base of the second output transistor to cause both of the first and second output transistors to operate in their non-conducting states and to terminate current flow to the control winding.

As will be discussed in greater detail hereinafter, the abovedescribed arrangement of the first and second output transistors is particularly useful in so-called "negative field" automotive electrical systems in which one end of the field (control) winding is connected directly to the negative voltage terminal of the storage battery. In this case, the above-mentioned "first output transistor" may be a relatively low-cost npn output power transistor rather than a less desirable temperature-sensitive germanium pnp output power transistor or a more expensive silicon pnp output power transistor.

The present invention also contemplates a voltage regulator circuit as generally described hereinabove which employs regenerative feedback in connection with a particular implementation of a control circuit for insuring that the first and second output transistors are operated sufficiently in their non-conducting states in response to the voltage across the first and second voltage terminals of the storage battery having a value equal to or exceeding the predetermined regulation value. A preferred implementation of the control circuit in accordance with the present invention includes a control transistor of the opposite conductivity type, a voltage breakdown device, and a voltage-sensing circuit means. The collector of the control transistor is coupled to the base of the second output transistor and the emitter is coupled to the second voltage terminal of the storage battery. The base of the control transistor is coupled to a first of two terminals of the voltage breakdown device. The voltage-sensing circuit means is coupled across the first and second voltage terminals of the storage battery and to the second of the two terminals of the voltage breakdown device. The voltage breakdown device has a predetermined breakdown voltage at which it breaks down and operates in a conducting state and below which it does not break down and operates in a non-conducting state. With the above arrangement of the control circuit elements, regenerative feedback voltage is provided to the second terminal of the voltage breakdown device by a regenerative feedback circuit means coupled to the emitter of the first output transistor and to the second terminal of the voltage breakdown device.

In the operation of the above-described control circuit and regenerative feedback circuit means, when the voltage across the first and second voltage terminals of the storage battery has a value less than the predetermined regulation value, a voltage is established at the second terminal of the voltage breakdown device by the voltage-sensing circuit means which is insufficient to cause the voltage breakdown device to break down and to operate in its conducting state, and to cause the control transistor to operate in its conducting state. As a consequence, the first and second output transistors are operated in their conducting states. However, when the voltage across the first and second voltage terminals of the storage battery has a value equal to or exceeding the predetermined regulation value, a voltage is established at the second terminal of the voltage breakdown device which is sufficient to cause the voltage breakdown device to break down and to operate in its conducting state and also to cause the control transistor to operate in its conducting state as a result of which the first and second output transistors are operated in their non-conducting states. As current flow through the first and second output transistors starts to become reduced, in response to the voltage across the first and second voltage terminals of the storage battery having a value equal to or exceeding the predetermined regulation value, the regenerative feedback circuit means operates to provide regenerative feedback voltage to the second terminal of the voltage breakdown device. This regenerative feedback voltage serves to cause the voltage breakdown device and the control transistor to both operate more fully in their conducting states and the first and second output transistors to both operate more fully in their non-conducting states.

BRIEF DESCRIPTION OF THE DRAWING

The single FIGURE illustrates in schematic diagram form a transistorized voltage regulator circuit in accordance with the present invention.

GENERAL DESCRIPTION OF THE INVENTION

Referring to the single figure, there is shown a transistorized voltage regulator circuit 1 in accordance with the present invention which employs regenerative feedback. As in the case of conventional well-known voltage regulator circuits, and as indicated in the figure, the voltage regulator circuit 1 of the present invention serves to control the operation of a dc generator or alternator (ac generator)G to regulate the value of the output voltage produced across the terminals of a battery B such as a standard lead-acid storage battery as commonly employed in automobiles and trucks. As is well known, the battery B is charged in a conventional manner by the dc generator or alternator G when current flows through an associated field winding W.

As indicated in the figure, the voltage regulator circuit 1 includes a complementary pair of output transistors 3 comprising an npn output power transistor $Q_1$ and a pnp output transistor $Q_2$. The collector of the npn output power transistor $Q_1$ is connected directly to the emitter of the pnp output transistor $Q_2$ and also to the positive side of the pnp output transistor $Q_2$ and also to the positive side of the battery B. The base of the npn output power transistor $Q_1$ is connected directly to the collector of the pnp output transistor $Q_2$, and the emitter is connected through the field winding W to the negative, grounded side of the battery B. To dampen voltage transients produced across the field winding W as current flow is alternately established and terminated therein, a diode D is connected in parallel with the field winding. In addition to the above circuit connections, the base of the pnp output transistor $Q_2$ is coupled through a current-limiting resistor $R_1$ to the negative, grounded side of the battery B, and a Miller capacitor $C_1$ is connected in a well-known manner between the base and the collector of the pnp output transistor $Q_2$. As will become apparent hereinafter from a detailed discussion of the operation of the voltage regulator circuit 1, when the output voltage produced across the terminals of the battery B has a value which is less than a predetermined regulation value, both of the output transistors $Q_1$ and $Q_2$ operate in their conducting states to supply current to the field winding W to initiate charging of the battery B toward the predetermined regulation value.

The voltage regulator circuit 1 further includes a pnp control transistor $Q_3$. The collector of the control transistor $Q_3$ is connected to the juncture of the base of the pnp output transistor $Q_2$ and the current-limiting resistor $R_1$, the emitter is connected directly to the positive side of the battery B, and the base is connected to the juncture of a base-emitter resistor $R_2$ and the cathode of a Zener breakdown diode Z. As in the case of the pnp output transistor $Q_2$, a Miller capacitor $C_2$ is connected between the base and collector of the pnp control transistor $Q_3$.

The anode of the Zener diode Z is connected to a resistive voltage-divider arrangement 5 connected between the positive and negative sides of the battery B and comprising series-connected resistors $R_3$, $R_4$, and $R_5$, and a resistor $R_6$ and a series temperature-compensating resistor $R_7$ arranged in parallel with the resistor $R_5$. As will be explained in detail hereinafter, when the value of the output voltage produced across the terminals of the battery B reaches the predetermined regulation value, a voltage is produced across the resistor $R_3$ causing both the Zener diode Z and the pnp control transistor $Q_3$ to conduct, and causing both of the output transistors $Q_1$ and $Q_2$ to become non-conducting thereby terminating current flow to the field winding W. As will also be explained hereinafter, a significant feature in the voltage regulator circuit shown in the figure is the inclusion of a regenerative feedback capacitor $C_3$ between the emitter of the pnp output power transistor $Q_1$ and the anode of the Zener diode Z. The feedback capacitor $C_3$ provides regenerative (positive) feedback to the anode of the Zener diode Z at such time as the output transistors $Q_1$ and $Q_2$ both start to switch either to their non-conducting states or their conducting states, thereby causing both of the output transistors $Q_1$ and $Q_2$ to switch abruptly and completely to such non-conducting or conducting states.

DETAILED OPERATION

The detailed operation of the transistorized voltage regulator circuit 1 is as follows. When the voltage across the positive and negative terminals of the battery B has a value less than a predetermined regulation value, the battery output voltage appears across the resistive voltage-divider arrangement 5. As indicated in the figure, the battery output voltage comprises both a dc voltage portion and a superimposed periodic ac voltage portion. The periodic ac portion is typically due to ignition noise and other voltage transients as commonly occur in an automotive electrical system in the normal operation of a vehicle. In accordance with well-known voltage-divider operation, a voltage is developed across the voltage-divider resistor $R_3$ having a value of $$\frac{R_3}{R_3+R_4+\frac{R_5(R_6+R_7)}{R_5+R_6+R_7}}(V_B),$$

where $V_B$ is the value at this time of the combined dc and ac portions of the output voltage across the terminals of the battery B. However, due to the particular values selected for the voltage-divider resistors $R_3$–$R_7$, the voltage developed across the resistor $R_3$ and, thus, presented at the anode of the Zener diode Z at this time, is insufficient to forward bias the Zener diode Z to its low-impedance, breakdown condition and to establish current flow into the base of the pnp control transistor $Q_3$. The pnp control transistor $Q_3$ therefore operates in its non-conducting, high-impedance state.

With the Zener diode Z and the pnp control transistor $Q_3$ both operating in their non-conducting, high-impedance states, the base of the pnp output transistor $Q_2$ is biased at a point above ground potential, and the emitter is biased at a positive potential with respect thereto by virtue of being connected directly to the positive side of the battery B. The value of the resistor $R_1$ is selected to establish a voltage at the base of the pnp output transistor $Q_2$ which is sufficiently negative with respect to the emitter so as to cause the transistor $Q_2$ to be forward-biased into its saturation state. A current path is therefore established extending from the positive side of the battery B, across the emitter-base junction of the transistor $Q_2$, and through the resistor $R_1$ to the negative, grounded side of the battery B. A current path is also established extending from the positive side of the battery B, between the emitter and collector of the transistor $Q_2$, and to the base of the npn output power transistor $Q_1$. As is well understood, the collector current produced by the pnp output transistor $Q_2$ has a value equal to the base current multiplied by the beta of the output transistor $Q_2$.

The collector current produced by the pnp output transistor $Q_2$ and applied to the base of the npn output power transistor $Q_1$ is sufficient to drive the transistor $Q_1$ into its saturation state, and to establish both base-emitter and collector-emitter current flow. Since the npn output power transistor $Q_1$ is connected for emitter-follower action, as is evident from the figure, the current applied to the base of the output power transistor $Q_1$ is amplified at the emitter by the beta of the output power transistor $Q_1$. With the particular complementary-pair arrangement of the npn output power transistor $Q_1$ and the pnp output transistor $Q_2$ indicated in the figure, the output power transistor $Q_1$ becomes saturated very rapidly, thus supplying emitter current to the field winding W very quickly in response to the output voltage of the battery B having a value less than the predetermined regulation value.

The above-described arrangement of the output transistors $Q_1$ and $Q_2$ is particularly significant in so-called "negative-field" vehicle electrical systems where, as in the figure, one end of the dc generator or alternator field winding is connected directly to the negative side of the battery, a common practice in the automotive industry. Heretofore, in such situation, it has been a common practice to use a germanium or silicon pnp output power transistor. However, as stated previously, germanium pnp transistors, while relatively inexpensive, are susceptible to producing excessive leakage currents at high ambient temperatures. Silicon pnp power transistors, while more stable than germanium pnp power transistors at high ambient temperatures, are relatively expensive and, hence, are unattractive from an economic standpoint, particularly when considered for use in high-volume, mass-produced vehicles such as automobiles and trucks. In accordance with the present invention, the particular arrangement of the npn output power transistor $Q_1$ and the pnp output transistor $Q_2$ permits the use of a relatively inexpensive npn transistor as an output power transistor instead of the less desirable pnp type in the aforementioned "negative-field" electrical systems.

The output current at the emitter of the output power transistor $Q_1$ and applied to the field winding W, as discussed hereinabove, is employed in the dc generator or alternator G for charging the battery B toward the regulation value. To prevent high-frequency components from being applied by the output power transistor $Q_1$ to the field winding W and causing possible radio frequency interference (RFI) in various parts of the associated electrical system, the Miller capacitor $C_1$ serves to reduce the gain of the pnp output transistor $Q_2$ at high frequencies by acting as a short circuit to high-frequency components appearing in the base circuit of the pnp output transistor $Q_2$. It is to be appreciated, however, that in applications where radio frequency interference can be tolerated, the Miller capacitor $C_1$, and/or the Miller capacitor $C_2$, may be omitted.

The emitter current produced by the npn output power transistor $Q_1$ and applied to the field winding W persists until such time as the peak value of the combined dc and ac voltage appearing across the positive and negative terminals of the battery B reaches the regulation value for the voltage regulator circuit 1. When this condition occurs, the combined dc and ac battery output voltage appearing across the terminals of the battery B appears across the resistive voltage-divider arrangement 5. A portion of the combined voltage, equal to $$\frac{R_3}{R_3+R_4+\frac{R_5(R_6+R_7)}{R_5+R_6+R_7}}(V_{REG}),$$

where $V_{REG}$ is the value of the regulation voltage, is applied to the anode of the Zener diode Z. This voltage is sufficient to cause the Zener diode Z to break down and to operate in its conducting, low-impedance state and also to forward-bias the pnp control transistor $Q_3$ into its conducting, low-impedance state. Thus, triggering of the Zener diode Z and the control transistor $Q_3$ occur only during the concurrence of the dc and the peak ac portions of the battery output voltage.

As the pnp control transistor $Q_3$ operates in its conducting state, a current path is established extending from the positive side of the battery B, between the emitter and collector of the transistor $Q_3$, and through the resistor $R_1$ to the negative, grounded side of the battery B. The voltage at the collector of the pnp control transistor $Q_3$ and, hence, at the base of the pnp output transistor $Q_2$, accordingly becomes more positive, and the pnp output transistor $Q_2$ accordingly starts to switch to its non-conducting, high-impedance state. As the pnp output transistor $Q_2$ starts to switch to its non-conducting, high-impedance state, base drive to the npn emitter-follower output power transistor $Q_1$ is reduced, thereby causing the output power transistor $Q_1$ also to start to switch to its non-conducting, high-impedance state. Accordingly, current flow to the field winding W starts to decrease.

As the npn output power transistor $Q_1$ starts to switch to its non-conducting state, the field current traversing the field winding W, which is inductive in nature, starts to decay toward zero value. During the time of this current decay, the regenerative feedback capacitor $C_3$ is charged by the decaying voltage (due to decaying current) across the field winding W. In other words, the field winding W acts at this time, together with the diode D, as a voltage generator in series with the feedback capacitor $C_3$. The voltage coupled by the feedback capacitor $C_3$ from the field winding W is applied to the anode of the Zener diode Z, causing the Zener diode Z to conduct more heavily than before and also causing the pnp control transistor $Q_3$ to operate in its saturation state. With the pnp control transistor $Q_3$ in its saturation state, the voltage between its collector and emitter (typically 0.2 volt) is insufficient to maintain conduction in the pnp output transistor $Q_2$ any longer and, accordingly, the pnp output transistor $Q_2$ switches abruptly and completely to its non-conducting, high-impedance state. As this action occurs, base drive to the npn emitter-follower output power transistor $Q_1$ is completely removed, thereby causing the output transistor $Q_1$ also to switch abruptly and completely to its non-conducting, high-impedance state and to terminate completely current flow to the field winding W. During the above operation of the transistors $Q_1$-$Q_3$, high-frequency components (RFI) are prevented from appearing in the collector circuit of the output power transistor $Q_1$ by the Miller capacitors $C_1$ and $C_2$. Also, by virtue of the abovementioned operating states of the transistors $Q_1$-$Q_3$, any spurious signals which might appear at the anode of the Zener diode Z are prevented from being processed.

As the pnp control transistor $Q_3$ is operated in its saturation state and the output transistors $Q_1$ and $Q_2$ are operated fully in their non-conducting states, the regenerative feedback capacitor $C_3$ discharges and applies regenerative feedback voltage to the anode of the Zener diode Z which causes the voltage across the voltage-divider resistor $R_3$ to decrease. When the voltage at the anode of the Zener diode Z has dropped to a level less than the combined values of the breakdown voltage of the Zener diode Z and the base-emitter voltage of the control transistor $Q_3$, due to the combined effects of the discharging of the feedback capacitor $C_3$ and battery voltage decreases reflected across the resistor $R_3$, the Zener diode Z comes completely out of its breakdown region, and the control transistor $Q_3$ switches completely to its non-conducting state. As a result, the output transistors $Q_1$ and $Q_2$ switch completely to their conducting states, thereby reestablishing current flow to the field winding W. The voltage regulator circuit 1 then continues to examine the voltage across the positive and negative terminals of the battery B, in the same manner as described hereinabove, to determined what, if any, further regulation is necessary. The discharge time of the feedback capacitor $C_3$ is determined by the values selected for the feedback capacitor $C_3$, and the voltage-divider resistors $R_3$-$R_7$.

The voltage regulator circuit 1 of the present invention is capable of effective operation over a wide range of temperatures due to the presence of the temperature-compensating resistor $R_7$. The temperature-compensating resistor $R_7$ is of the negative-coefficient type such that its resistance decreases with increases in ambient temperature and increases with decreases in ambient temperature. The effect of a decrease in the value of the resistor $R_7$ is to decrease the effective combined resistance of the resistors $R_4$-$R_7$ and, therefore, to decrease the value of the regulation voltage of the battery B as established by the voltage divider arrangement 5 across the resistor $R_3$. The effect of an increase in the value of the resistor $R_7$ is to increase the effective combined resistance of the resistors $R_4$-$R_7$ and, therefore, to increase the value of the regulation voltage of the battery B as established by the voltage-divider arrangement 5 across the resistor $R_3$. Thus, the value of the regulation voltage for the voltage regulator circuit 1 is higher for low ambient temperatures than for high ambient temperatures.

Some typical values for the parameters of the components employed in the above-described voltage regulator circuit are as follows:

| | |
|---|---|
| $Q_1$ | MJE3055 (Motorola) |
| $Q_2$ | 2N3645 |
| $Q_3$ | 2N3638A |
| Z | 1N710 A (6.8v) |
| D | 1N4002 |
| B | 12v. |
| $R_1$ | 680 ohms |
| $R_2$ | 4.7 kilohms |
| $R_3$ | 1.6 kilohms |
| $R_4$ | 790 ohms |
| $R_5$ | 950 ohms |
| $R_6$ | 2 kilohms |
| $R_7$ | 5 kilohms (at 25°C.) |
| $C_1$ | 0.022 microfarads |
| $C_2$ | 0.05 microfarads |
| $C_3$ | 0.01 microfarads |

For the above circuit values, the regulation voltage for the 12-volt battery B has a value at room temperature (25° C.) of approximately 14.4 volts. At −20° C., the regulation voltage for the battery B has a value of approximately 14.9 volts (due to the value of resistor $R_7$ increasing) and, at 100° C., a value of approximately 13.6 volts (due to the value of resistor $R_7$ decreasing).

While there has been shown and described what is considered a preferred embodiment of the present invention, it will be obvious to those skilled in the art that various changes and modifications may be made therein without departing from the invention as called for in the appended claims.

What is claimed is:

1. A voltage regulator circuit for an electrical system including a power source adapted to provide charging current to a storage battery having first and second voltage terminals across which an output voltage is supplied, said power source including a control winding having one end connected directly to the first voltage terminal of the storage battery, said voltage regulator circuit comprising:

a first output transistor of a first conductivity type and having a base, collector, and an emitter, the collector being coupled to the second voltage terminal of the storage battery, and the emitter being coupled to the other end of the control winding;

a second output transistor of the opposite conductivity type and having a base, collector, and an emitter, the collector being coupled to the base of the first output transistor and the emitter being coupled to the collector of the first output transistor;

said first and second output transistors each having a conducting state during which current flows therethrough and to the control winding and a non-conducting state during which current does not flow to the control winding;

the polarities of the first and second terminals of the storage battery to which the emitter and collector of the first output transistor are respectively coupled being such that when a predetermined first signal condition is present at the base of the second output transistor the base-emitter junctions of the first and second output transistors are forward biased and current flows therethrough and to the control winding, and such that when a predetermined second signal condition is present at the base of the second output transistor the base-emitter junctions of the first and second output transistors are reverse biased and current does not flow to the control winding; and control circuit means comprising:

a control transistor of the opposite conductivity type and having a base, collector, and an emitter, the collector being coupled to the base of the second output transistor, and the emitter being coupled to the second voltage terminal of the storage battery, said control transistor having a non-conducting state during which a first signal condition is produced at the collector thereof and presented at the base of the second output transistor causing the first and second output transistors to operate in their conducting states, and a conducting state during which a second signal condition is produced at the collector thereof and presented at the base of the second output transistor causing the first and second output transistors to operate in their non-conducting states;

a voltage breakdown device having a predetermined breakdown voltage at which said device breaks down and operates in a conducting state and below which said device does not break down and operates in a non-conducting state, said voltage breakdown device having a first terminal and a second terminal, the first terminal being coupled to the base of the control transistor; and voltage-sensing circuit means coupled across the first and second voltage terminals of the storage battery and to the second terminal of the voltage breakdown device and operable when the output voltage across the first and second voltage terminals of the storage battery has a value less than a predetermined regulation value to establish a voltage at the second terminal of the voltage breakdown device which is insufficient to cause the voltage breakdown device and the control transistor to operate in their conducting states whereby said first signal condition is produced at the collector of the control transistor and the first and second output transistors both operate in their conducting states, and operable when the output voltage across the first and second voltage terminals of the storage battery has a value equal to or greater than the predetermined regulation value to establish a voltage at the second terminal of the voltage breakdown device which is sufficient to cause both the voltage breakdown device and the control transistor to operate in their conducting states whereby the second signal condition is produced at the collector of the control transistor and the first and second output transistors both operate in their non-conducting states.

2. A voltage regulator circuit for an electrical system including a power source adapted to provide charging current to a storage battery having positive and negative voltage terminals across which an output voltage is supplied, said power source including a control winding having one end connected directly to the negative voltage terminal of the storage battery, said voltage regulator circuit comprising:

an npn output power transistor having a base, collector, and an emitter, the collector being connected directly to the positive voltage terminal of the storage battery, and the emitter being connected directly to the other end of the control winding;

a pnp output transistor having a base, collector, and an emitter, the collector being connected directly to the base of the npn output power transistor and the emitter being connected directly to the collector of the npn output power transistor;

said npn output power transistor and said pnp output transistor each having a conducting state during which current flows therethrough and to the control winding and a non-conducting state during which current does not flow to the control winding; and control circuit means connected across the positive and negative voltage terminals of the storage battery and to the base of the npn output transistor and operative when the output voltage across the positive and negative voltage terminals of the storage battery has a value less than a predetermined regulation value to produce a first voltage condition at the base of the pnp output transistor and the npn output power transistor to operate in their conducting states whereby current flows therethrough and to the control winding, and operative when the output voltage across the positive and negative terminals of the storage battery has a value equal to or exceeding the predetermined regulation value to produce a second voltage condition at the base of the pnp output transistor causing both the pnp output transistor and the npn output power transistor to operate in their non-conducting states whereby current does not flow to the control winding;

said control circuit means including:

a pnp control transistor having a base, collector, and emitter, the collector being connected directly to the base of the pnp output transistor, and the emitter being connected directly to the positive voltage terminal of the storage battery;

a Zener breakdown diode having an anode and a cathode, the cathode being connected directly to the base of the pnp control transistor; and a resistive voltage divider arrangement comprising:

a first resistance connected between the anode of the Zener breakdown diode and the positive voltage terminal of the storage battery; and an additional resistance connected between the anode of the Zener breakdown diode and the negative voltage terminal of the storage battery.

3. A voltage regulator circuit for an electrical system including a power source adapted to provide charging current to a storage battery having first and second voltage terminals across which an output voltage is supplied, said power source including a control winding having one end connected directly to the first voltage terminal of the storage battery, said voltage regulator circuit comprising:

a first output transistor of a first conductivity type and having a base, collector, and an emitter, the collector being coupled to the second voltage terminal of the storage battery, and the emitter being coupled to the other end of the control winding;

a second output transistor of the opposite conductivity type and having a base, collector, and an emitter, the collector being coupled to the base of the first output transistor and the emitter being coupled to the collector of the first output transistor;

said first and second output transistors each having a conducting state during which current flows therethrough and to the control winding and a non-conducting state during which current does not flow to the control winding;

the polarities of the first and second terminals of the storage battery to which the emitter and collector of the first output transistor are respectively coupled being such that when a predetermined first signal condition is present at the base of the second output transistor the base-emitter junctions of the first and second output transistors are forward biased and current flows therethrough and to the control winding, and such that when a predetermined second signal condition is present at the base of the second output transistor the base-emitter junctions of the first and second output transistors are reverse biased and current does not flow to the control winding;

a control transistor of the opposite conductivity type and having a base, collector, and an emitter, the collector being coupled to the base of the second output transistor, and the emitter being coupled to the second voltage terminal of the storage battery, said control transistor having a non-conducting state during which a first signal condition is produced at the collector thereof and presented at the base of the second output transistor causing the first and second output transistors to operate in their conducting states, and a conducting state during which a second signal condition is produced at the collector thereof and presented at the base of the second output transistor causing the first and second output transistors to operate in their non-conducting states;

a voltage breakdown device having a predetermined breakdown voltage at which said device breaks down and operates in a conducting state and below which said device does not break down and operates in a non-conducting state, said voltage breakdown device having a first terminal and a second terminal, the first terminal being coupled to the base of the control transistor;

voltage-sensing circuit means coupled across the first and second voltage terminals of the storage battery and to the second terminal of the voltage breakdown device and operable when the output voltage across the first and second voltage terminals of the storage battery has a value less than a predetermined regulation value to establish a voltage at the second terminal of the voltage breakdown device which is insufficient to cause the voltage breakdown device and the control transistor to operate in their conducting states whereby said first signal condition is produced at the collector of the control transistor and the first and second output transistors both operate in their conducting states, and operable when the output voltage across the first and second voltage terminals of the storage battery has a value equal to or greater than the predetermined regulation value to establish a voltage at the second terminal of the voltage breakdown device which is sufficient to cause both the voltage breakdown device and the control transistor to operate in their conducting states whereby the second signal condition is produced at the collector of the control transistor and the first and second output transistors both operate in their non-conducting states; and a regenerative feedback circuit means coupled to the emitter of the first output transistor and to the second terminal of the voltage breakdown device and operable when current flow through the first and second output transistors starts to become reduced to provide regenerative feedback voltage to the second terminal of the voltage breakdown device whereby said voltage breakdown device and said control transistor operate more fully in their conducting states and said output transistors both operate more fully in their non-conducting states.

4. A voltage regulator circuit in accordance with claim 3 wherein the regenerative feedback circuit means includes a capacitance coupled between the emitter of the first output transistor and the second terminal of the voltage breakdown device.

5. A voltage regulator circuit in accordance with claim 4 including a diode connected across the control winding.

6. A voltage regulator circuit in accordance with claim 3 wherein the voltage-sensing circuit means comprises:

a first resistance connected between the second terminal of the voltage breakdown device and the second voltage terminal of the storage battery; and additional resistance connected between the second terminal of the voltage breakdown device and the first voltage terminal of the storage battery.

7. A voltage regulator circuit in accordance with claim 6 wherein the voltage breakdown device is a Zener diode.

8. A voltage regulator circuit for an electrical system in accordance with claim 7 wherein the output voltage across the first and second voltage terminals of the storage battery comprises a dc voltage portion, said electrical system further including means superimposing a periodic ac voltage portion on the dc voltage portion, whereby said Zener diode and said control transistor operate in their conducting states when the amplitude of the dc voltage portion and the peak amplitude of the ac voltage portion have a combined value equal to or exceeding the predetermined regulation value.

9. A voltage regulator circuit in accordance with claim 8 wherein the regenerative feedback circuit means includes a capacitance coupled between the emitter of the first output transistor and the second terminal of the Zener diode.

10. A voltage regulator circuit in accordance with claim 9 including a diode connected across the control winding.

11. A voltage regulator circuit in accordance with claim 10 wherein
said additional resistance includes a temperature-compensating resistance.

12. A voltage regulator circuit in accordance with claim 10 further comprising:

a first Miller capacitance coupled between the base and collector of the second output transistor; and a second Miller capacitance coupled between the base and collector of the control transistor.

13. A voltage regulator circuit in accordance with claim 10 wherein:

the first voltage terminal of the storage battery is a negative voltage terminal and the second voltage terminal is a positive voltage terminal;

the first output transistor is an npn power transistor;

the second output transistor is a pnp transistor;

the control transistor is a pnp transistor; and the first terminal of the Zener diode is a cathode terminal, and the second terminal is an anode terminal.

14. A voltage regulator circuit for an electrical system in accordance with claim 13 wherein the power source is an electrical generator and the control winding is a field winding.

* * * * *